United States Patent [19]

Gallagher et al.

[11] Patent Number: 4,635,238
[45] Date of Patent: Jan. 6, 1987

[54] DATA PROCESSING METHOD FOR CORRECTING P AND S WAVE SEISMIC TRACES

[75] Inventors: Joseph G. Gallagher; Kay D. Wyatt, both of Bartlesville, Okla.

[73] Assignee: Phillips Petroleum Company, Bartlesville, Okla.

[21] Appl. No.: 649,632

[22] Filed: Sep. 12, 1984

[51] Int. Cl.$^4$ ............................................. G01V 1/36
[52] U.S. Cl. ...................................... 367/40; 367/31; 367/57; 367/75
[58] Field of Search ........................ 307/27, 31, 33, 40, 307/41, 52, 57, 75; 364/421, 821

[56] References Cited

U.S. PATENT DOCUMENTS

| | | | |
|---|---|---|---|
| 3,127,950 | 4/1964 | Itria | 121/5 |
| 3,208,549 | 9/1965 | Alexander | 181/5 |
| 4,105,993 | 8/1978 | Grassy | 340/15.5 |
| 4,210,966 | 7/1980 | Ingram | 367/28 |
| 4,222,165 | 12/1983 | Thomas | 367/40 |
| 4,328,567 | 5/1982 | Dodge | 367/32 |
| 4,342,518 | 8/1982 | Shirley | 374/44 |
| 4,422,165 | 12/1983 | Thomas | 367/40 |
| 4,527,260 | 7/1985 | Horowicg | 367/27 |
| 4,534,019 | 8/1985 | Wiggins et al. | 364/421 |
| 4,562,556 | 12/1985 | Ingram et al. | 367/27 |

OTHER PUBLICATIONS

Ward et al., "Cubic Spline . . . RMS Velocity Data"; 1979, pp. 443-457, Geophys, Prosp., III, 27(2), cite only.
The Smoothing of Seismological Travel-Time Tables Using Cubic Splines", 1970, pp. 1077-1087, Seismol. Soc. Americ. Bull. vol. 60, #6, cite only.
Wyatt, "Synthetic Vertical Seismic Profile," 6/81, pp. 880-891, Geophysics, vol. 46, #6.
DiSiena et al., Three-Component Vsp . . . Technique", 1983, Geophysics, 519.1, Annual Mtg Abst.
Anno, Statics Solutions and Event Correlations: Two Critical Aspects of Shear Wave Exploration-9/-11-15/83 pp. 347-348.
Robertson, Bright Spot Validation Using Comparative P-Wave & S-Wave Seismic Sections, 9/11-15/83, pp. 355-356.

Primary Examiner—Nelson Moskowitz
Attorney, Agent, or Firm—William R. Sharp

[57] ABSTRACT

A method of processing seismic data enables correlation of P and S-wave seismic traces. First, P and S-waves are transmitted into the subsurface. The two-way vertical travel times are then measured for each wave to different depths so as to yield two sets of time-depths pairs. Mathematical functions relating two-way vertical travel time, $T_s$ or $T_p$, and depth are fitted to each set of time-depth pairs. These functions are combined to yield an expression relating $T_s$ and $T_p$. This expression may be utilized to rescale one of the traces to yield correlated P and S-wave traces.

17 Claims, 8 Drawing Figures

DATA PROCESSING METHOD FOR CORRECTING P AND S WAVE SEISMIC TRACES

BACKGROUND OF THE INVENTION

This invention relates to a method of seismic data processing for correlating P and S-wave seismic traces.

For many years, seismic exploration for oil and gas has involved the use of a source of seismic energy and its reception by an array of seismic detectors, generally referred to as geophones. When used on land, the source of seismic energy can be a high explosive charge electrically detonated in a borehole located at a selected grid point in a terrain or is an energy source capable of delivering a series of impacts or mechanical vibrations to the earth's surface. The acoustic waves generated in the earth by these sources are transmitted back from strata boundaries and reach the surface of the earth at varying intervals of time, depending on the distance and the characteristics of the subsurface traversed. These returning acoustic waves are detected by the geophones, which function to transduce such acoustic waves into representative electrical signals. The plurality of geophones are arrayed in a selected manner to detect most effectively the returning acoustic waves and generate electrical signals representative thereof from which data may be deduced concerning the geological subsurface of the earth.

Recently, two particular types of waves, described below, have been utilized to obtain more data on the subsurface structure.

Elastic waves in a solid propagate according to several modes. One mode of propagation of elastic waves is a compressional wave, or "P-wave", in which particle motion within the solid is in a direction perpendicular to the wavefront. In another mode, the shear or "S-wave" mode, the particle motion within the solid is parallel to the wavefront. The S-wave can be one of two components, SH or SV, where the particle motion of the SH-wave is perpendicular to the SV-wave. Compressional and shear waves travel at different velocities in a given solid and the ratio of these velocities, $V_p/V_s$, is a function of and hence indicative of the material in which the waves are propagating.

Typically, $V_p/V_s$ ratios are calculated as follows. First P and S-waves are generated at the surface, for example, by the technique in which a mechanical vibration is imparted to the earth by a sinusoidal plate motion or an inclined impulse hammer. Each wave is detected conventionally by geophones which generate electrical signals in the form of wiggle traces. These signals representing the P and S-wave seismic traces or sections are then processed in a manner which is more fully described below to correlate the two traces. That is, one trace is stretched or contracted to correspond to the time scale of the other trace. As noted above, the P-waves can travel much faster than the S-waves in materials. Thus, the P and S wave seismic traces which are recorded may be superimposed to pick out corresponding reflection events for a common subsurface reflection point. From the correlated P and S-traces, a common sedimentary interval (strata layer) is identified on each seismic trace. The respective P-wave and S-wave travel times $\Delta T_p$ and $\Delta T_s$ in the interval are then measured between the peaks or troughs of reflection events delineating the interval. Under the assumption that the P-wave and S-wave velocities are constant within the interval, the $V_p/V_s$ ratio for the interval is then $$V_p/V_s = (1/\Delta T_p)/(1/\Delta T_s) = \Delta T_s/\Delta T_p.$$

Thus, the above interval measurement of $V_p/V_s$ ratio is based on matching a single point, say the peak on each P-wave reflection event with a corresponding point on each S-wave reflection event; that is, each pair of points is intended to represent the same physical location in the subsurface. Error is introduced into the $V_p/V_s$ calculation when a pair of these chosen points do not, in fact, match the same subsurface point. Therefore, error in the calculation arises from an inaccurate correlation of each trace, giving rise to difficulties in identifying corresponding reflection events on P and S wave traces. A difference in $V_p/V_s$ with respect to different types of rocks is not very great, and accordingly, very accurate interval measurements of the $V_p/V_s$ ratio are necessary before reliable determinations of the sub-surface geology can be made. In particular, it is found that $V_p/V_s$, which can vary between about 1.20 and about 2.50, must be measured with an accuracy above about 0.1 or better if the results are to be useful.

Prior P and S-wave correlation methods have not been highly accurate over the entire P and S wave seismic traces, causing inaccurate $V_p/V_s$ ratio estimates to be obtained over most of the P and S wave seismic traces.

For example, the oldest and least accurate method of correlating P and S-waves involves assuming a constant $V_p/V_s$ ratio of about 2 and ratioing the plotting scales for the P and S data traces accordingly. This method totally disregards the nonlinear nature of the $V_p/V_s$ ratio, and thus gives a correlation making the matching of corresponding reflection events on each trace extremely difficult, if not impossible.

In another correlation method, as described in U.S. Pat. No. 4,422,165 of Thomas et al, various constant stretch factors associated with different ratios of compressional to shear wave velocities are applied to a P-wave reflection segment until a best correlation with the corresponding S-wave reflection segment is obtained. This correlation is then associated with a given constant $V_p/V_s$ ratio for that segment. The optimization and accuracy of the correlation process, hence the precision of the $V_p/V_s$ ratio, is then estimated by a maximum likelihood technique. This method is an improvement over the above method, but still has inaccuracies due to the application of constant ratios. Furthermore, the absence of a P or S-wave reflection event in a geological interval, containing information on P and S wave velocity contrasts in that interval, could not be correlated by the method described in Thomas et al.

SUMMARY OF THE INVENTION

It is, therefore, an object of the present invention to provide a method of correlating P and S-waves seismic sections which achieves a more accurate correlation than prior methods over the entire P and S wave seismic traces.

It is another object of the present invention to provide a correlation method which can correlate time segments in P and S-wave seismic sections where there are no reflection events in either the P or S-wave section.

The above objects are realized in a method enabling correlation of P and S-traces in which an expression relating P and S-wave two-way times through a subsurface is obtained. First, P and S-waves are transmitted into the subsurface. The two-way vertical travel times are then measured for each wave to different depths so as to yield two sets of time-depth pairs. Mathematical functions relating two-way vertical travel time, $T_s$ or $T_p$, and depth Z are fitted to each set of time-depth pairs. These functions are combined so as to give an expression relating $T_s$ and $T_p$. This expression may be utilized to rescale one of the traces to yield correlated P and S-wave traces.

Two embodiments of the present method are described herein. These embodiments utilize either vertical seismic profile (VSP) or surface seismic profile (SSP) techniques to measure the above mentioned two-way vertical travel times at each depth for correlation of P and S wave data traces.

The method of the present invention gives a far more accurate correlation between P and S-wave data traces than prior methods. This accurate correlation assists in making very accurate interval $V_p/V_s$ ratio calculations over the entire P and S wave seismic traces, as will be described below. The two traces may be correlated in a more general way so that segments in the traces having no corresponding reflection events may still be correlated in time. Furthermore, the SSP embodiment requires no well control data to perform the correlation.

DESCRIPTION OF THE PREFERRED EMBODIMENTS

A method of correlating P and S-wave seismic traces is described herein. The method employs the processing of seismic data to yield an expression relating P-wave and S-wave two way times.

Figure 1:
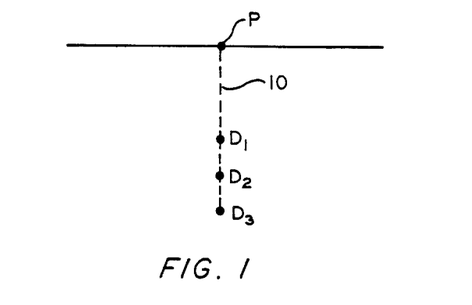
FIG. 1 is a schematic illustrating various depth points in the earth surface.

Referring now to FIG. 1, this simple schematic will be used to facilitate a clear understanding of terminology used throughout this disclosure. As used herein, "vertical two way travel time" to a certain depth is defined as the time it takes for a wave to travel from a point on the earth's surface directly above a certain depth point to the certain depth point, plus the time necessary for the wave to travel back to the surface point. Referring to FIG. 1, the vertical two way travel time to depth point $D_1$ is the travel time of a wave from P to $D_1$ to P. Similarly, the vertical two way travel time to depth point $D_2$ is the travel time of a wave from P to $D_2$ to P. Note that the wave path is along an imaginary vertical line 10 connecting the depth points and P.

Two embodiments of the present method will be described below, each of which utilizes a particular seismic profile to derive time-depth pairs necessary to achieve the desired P and S-wave correlation.

Figure 2:
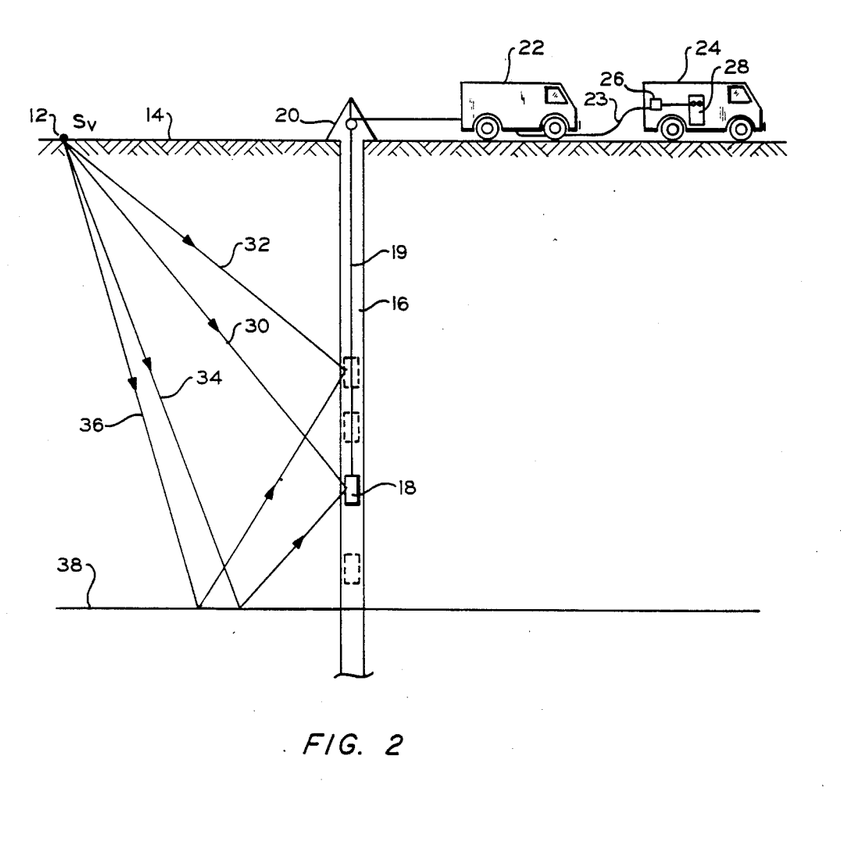
FIG. 2 is an illustration of an apparatus employed in the method of the present invention utilizing vertical seismic profile (VSP) data.

Turning now to FIG. 2, references will be made to this Figure to describe an embodiment which utilizes a vertical seismic profile (VSP) apparatus. An acoustic wave source or sources $S_v$, denoted by reference character 12, is shown located on the surface of the earth 14. Source or sources 12 must be capable of producing both P and S-waves to be imparted through the earth's subsurface. One possible acoustic wave source compatible with the present invention is an impulse hammer oriented at a 45 degree angle with respect to the earth's surface. Such an impulse hammer produces both P and S-waves simultaneously which may be later separated by computer data processing. Although the method of the present invention will be described assuming the use of such a source, it should be understood that other types of P and S-wave sources could be employed which generate P and S-waves at different times, e.g. P and S-wave mechanical vibrator sources.

A borehole 16 is drilled in the subsurface for passing a geophone tool 18 therethrough. As shown by the dashed line representations of the geophone tool, the geophone tool 18 may be raised or lowered to any desired depth by means which will be described below. Geophone tool 18 may be, by way of example, a conventional 3-component geophone tool comprising three mutually orthogonal geophones: two horizontal geophones and one vertical geophone along the radial and longitudinal directions of the geophone tool, respectively.

Wire line 19 is provided to support geophone tool 18 and also to feed electrical data to processing equipment later described. Wire line 19 is looped around a pulley mechanism 20, and fed into a drawworks or mast truck 22. Drawworks truck 22 contains a supply of wire line and some means for generating a signal indicative of the depth of geophone tool 18. Line 23 feeds the various data to truck 24, which contains amplifying equipment 26 and recorder 28. The various recorded data are typically taken in reel form from the seismic exploration site to a suitable computer facility for processing of the data. Alternately, a minicomputer might be provided to perform the data processing at the test site.

P and S-waves are generated by source or sources 12. Four representative paths of these waves are shown in FIG. 2. The waves transmitted along paths 30 and 32 are unreflected, and therefore travel directly from source 12 to geophone tool 18 at two different depths as shown. It should be understood that at each depth of geophone tool 18, a new acoustic wave must be generated by source 12. The travel times for these direct path waves are called direct arrival times. In other words, the direct arrival time is the shortest travel time from source to geophone. Referring now to paths 34 and 36, these are paths of waves reflected by a subsurface reflector shown at 38, such as a rock layer interface. It is emphasized that in this particular embodiment, both P and S-waves are directed along each path shown in FIG. 2. Obviously, waves from source 12 are reflected to geophone 18 at a particular depth by many subsurface reflectors. Thus, the direct arrival of energy and many reflection events are typically detected by geophone tool 18 at a particular depth.

The apparatus shown in FIG. 2 may be operated as follows according to the present method. Geophone tool 18 is typically lowered to a certain depth near the top of borehole 16. Reflected and direct arrival P and S-waves are detected by geophone tool 18 and representative signals are fed through wire line 19 to truck 22, and into truck 24 where the signals are amplified and recorded. Likewise, geophone tool 18 is sequentially lowered to a plurality of depths within borehole 16, and seismic traces and their corresponding depths are recorded at each depth in a similar manner. It should be understood that geophone tool 18 is clamped to the borehole wall at various depths in any convenient manner. Raw seismic data on each of the three geophones in the tool is recorded and then processed by a suitable computer and filtering equipment as described below.

As explained above, three seismic signals are recorded on the three orthogonal geophones in tool 18 at each depth for further processing. First, conventional orthogonal transformations, Eulerian rotations are applied to the three geophone traces. Such computer processing artificially orients the three orthogonal phones in tool 18 at each depth so as to orient particular phones to receive only P or, P and SV, or SH-waves. Thus, the three raw geophone traces are essentially transformed into another set of three traces which affects the separation of P, SV and SH wave modes on the different geophones. For example, one geophone may correspond to the P-mode; the second geophone to the SH-mode; and the third geophone to both the P and SV-modes. At this point, frequency wave number (FK) filtering is preferably applied to each trace to suppress (by i.e. about 40 dB) downgoing energy events (those arriving at the tool in a generally downward direction and pass only upgoing energy events from reflectors beneath the geophone tool.

After the above processing in which the modes are essentially separated for each geophone depth, each depth and its corresponding direct arrival time for the P-wave and S-wave are stored in memory. Direct arrival times were discussed above in reference to paths 30 and 32 in FIG. 2. It should be understood that P and S-waves could be produced at different times and detected accordingly as an alternative to that described above.

The direct arrival times at each depth are now converted to vertical one-way times to correct for the offset between the source 12 and geophone tool 18. In other words, the direct arrival time along path 32 in FIG. 2 can be expressed as the time of travel from a pseudo source directly above geophone tool 18, wherein this time of travel from the pseudo source is a one-way vertical travel time. The one-way vertical travel time for any particular depth may be easily calculated from source-geophone geometry. Accordingly, $T_v = T_a \cos \theta$, where $T_v$ is the one-way vertical travel time, $T_a$ is the actual one-way travel time or direct arrival time, and $\theta$ is the angle of incidence of the wave at geophone tool 18. $\theta$ may be found from the expression $\tan \theta = x/z$, where x is the horizontal distance between source 12 and a point directly above geophone tool 18, and z is the depth of geophone tool 18.

After the one-way vertical travel times corresponding to direct arrival times at each depth for each type of wave are calculated, these one-way times are multiplied by two to give two-way vertical travel times. Thus, for each mode, there has been derived a set of data pairs hereinafter called time-depth pairs. Each time-depth pair includes a two-way vertical travel time value and a depth value. In the following discussion, the depth value is denoted by z, the two-way vertical travel time for the P-mode by $T_p$, and the two-way vertical travel time for the S-mode by $T_s$. Typically, between about 50 and 100 time-depth pairs for each mode are obtained, although higher numbers will give even better results.

Each set of time-depth pairs are now fitted to a mathematical function, such as a polynomial or any arbitrary function, which relates two-way travel time to depth. The function chosen may be one of a number of functions such as quadratic, cubic, or cubic spline. This embodiment of the present method will be described in terms of a quadratic fit. The general form for a quadratic equation is $$y = a + bx + cx^2. \qquad (1)$$

Here, the two variables are two-way travel time, $T_s$ or $T_p$, and depth z. Thus, for the P-mode, a quadratic equation may be written as $$T_p = A_p z^2 + B_p z + C_p, \qquad (2)$$

and for the S-mode, a quadratic equation may be written as $$T_s = A_s z^2 + B_s z + C_s, \qquad (3)$$

where $A_p$, $B_p$, $C_p$, $A_s$, $B_s$, and $C_s$ are constant coefficients.

The set of time-depth pairs for each mode may be most conveniently fitted to the quadratic functions (2) and (3) above by least squares fitting. However, it should be understood that any regression type fitting technique would be utilized. According to the least squares method, $\chi^2$, the goodness of fit to the data, is minimized, where $$\chi^2 = \Sigma \frac{\Delta T_i^2}{\sigma_i} = \Sigma \left[ \frac{1}{\sigma_i} (T_i - C - B z_i - A z_i^2)^2 \right]. \qquad (4)$$

As used in equation (4), T, A, B, and C are written generally, and can be applied to the P or S-mode. Setting the derivatives of $\chi^2$ in equation (4) with respect to coefficients A, B, and C equal to zero yields three simultaneous equations. These simultaneous equations may be solved to give optimum values for the coefficients in terms of determinants. For a detailed discussion of least squares fitting, reference is made to *Data Reduction and Error Analysis for the Physical Scientist* by Philip R. Berington, McGraw Hill Inc., 1969, of which pages 134-136 are herein incorporated by reference.

Figure 3:
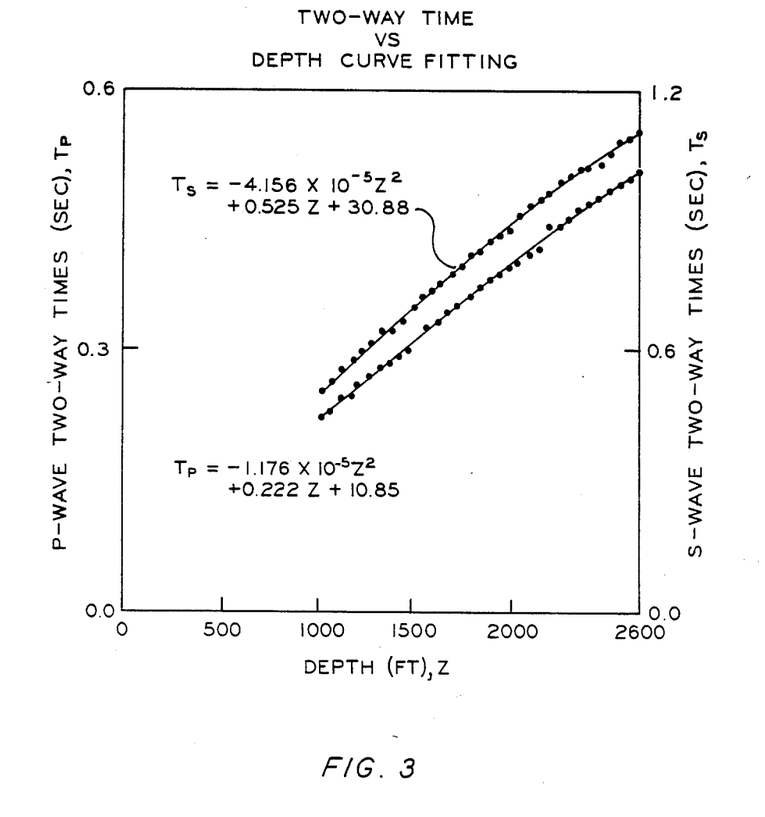
FIG. 3 is a graphical representation showing quadratic curves fitted to P and S-wave time-depth pair points, which will be described in detail below.

Referring now to FIG. 3, there are shown typical quadratic equation fits to time-depth pairs for the P and S-modes. The particular coefficients shown are those for a specific example which will be described below. Note also that the time axes are scaled differently for each type of wave.

A relationship between $T_s$ and $T_p$ may be obtained as follows. First, one of the functions (2) or (3) is solved for z. For the sake illustration, (3) is solved for z, wherein $$z = \frac{-B_s - \sqrt{B_s^2 - 4A_s(C_s - T_s)}}{2A_s} \quad (5)$$

The expression for z above is then substituted into the other function, in this case (2), to yield the following expression relating $T_s$ and $T_p$:

$$T_p = \frac{A_p}{2A_s^2} \{B_s^2 + B_s\sqrt{B_s^2 - 4A_s(C_s - T_s)} - 2A_s(C_s - T_s)\} + \frac{B_p}{+C_p} \{-B_s - \sqrt{B_s^2 - 4A_s(C_s - T_s)} /2A_s\}. \quad (6)$$

Figure 4:
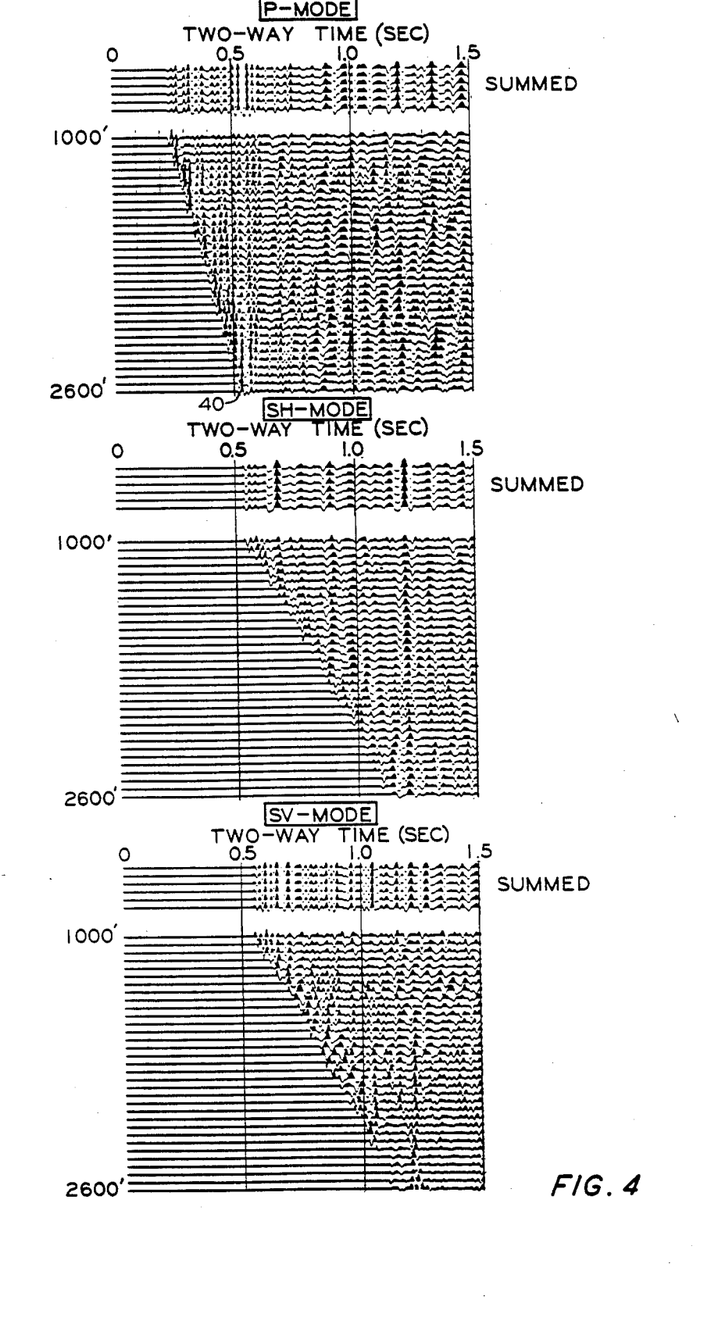
FIG. 4 shows sets of P, SH, and SV-wave traces obtained with the VSP embodiment of FIG. 2.

By using equation (6) relating $T_p$ and $T_s$, P and S-traces may be correlated. In this regard, the correlation of the P and S-traces as detected by geophone tool 18 will be described. Before correlation takes place, the P and S-traces are corrected for normal moveout (NMO). The normal moveout correction applied to each trace at each depth corrects for offset distance of the seismic source from the well head. Essentially, this involves converting actual travel times along the traces to vertical travel times in a manner similar to that described above for the direct travel times. Each trace is shifted by its respective vertical direct travel time. Traces after such corrections are made are shown in FIG. 4 for the P, SH, and SV modes for a particular example, described below. For each mode, the traces are shown as follows. Each trace in the bottom sets of traces is for a particular depth of geophone tool 18. The top sets of traces are repetitive duplicates of the summed trace. Each summed trace is the trace resulting from summing of the bottom traces. The traces shown are plotted according to two-way vertical time, the two-way times of various reflection events being essentially the time taken for the wave to be transmitted to the reflector, and back up to a pseudo-surface receiver. Therefore, the traces shown in FIG. 3 are traces detected by a VSP borehole geophone, which have been corrected to correspond to traces as they would be detected on the surface. Referring to the start of the trace for the P-mode at 2600 feet, the two-way time at this point can be seen to be about 0.5 seconds. This is the two-way vertical travel time corresponding to the direct travel time of the P-wave to the geophone tool at this depth. Before entering the discussion on correlation, however, it should be understood that each trace is stored in a computer memory as a plurality, usually at least several hundred, of data points. The number of data points stored is dependent on a predetermined sampling interval. For example, where a sampling interval of 0.002 seconds is used, a trace one second in length will be stored in memory as 500 different points.

Turning now to the various steps in the correlation operation, the data points for each trace in the sets of P and S-wave (either the SH or SV) traces are sequentially stored in a computer memory, such as a data buffer, in a looping type process. Reference might be made to FIG. 4 to better conceptualize the correlating operation. Also, although in the case herein described, the S-trace is rescaled as a pseudo P-trace, it should be understood that the P-trace could be rescaled as a pseudo S-trace.

Next, the S-wave vertical two-way time for each S-trace data point is substituted for $T_s$ in equation (6) relating $T_s$ and $T_p$ to yield corresponding P-wave vertical two way time $T_p$. For a particular S-trace, this calculation process is carried out sequentially for each data point down the entire trace. Thus, a table is essentially now stored in memory with $T_s$ and corresponding $T_p$ values.

Considering a particular S-trace, the first data point of this trace will be considered. Data for the first data point, previously stored as noted above for a $T_s$ value, is reassigned to a new memory "slot" at the previously calculated corresponding $T_p$ value. This process is continued for each data point on the S-trace. Thus, each data point on the S-trace is reassigned to P-wave two-way time, such that the S-trace is now stored in memory as a pseudo P-trace on the P-time scale. It is said that the S-trace is rescaled. Similarly, each S-trace is rescaled as described above to achieve correlation with corresponding P-traces. Although the rescaling process is described as a digital process, analog techniques could conceivably be utilized.

Figure 5:
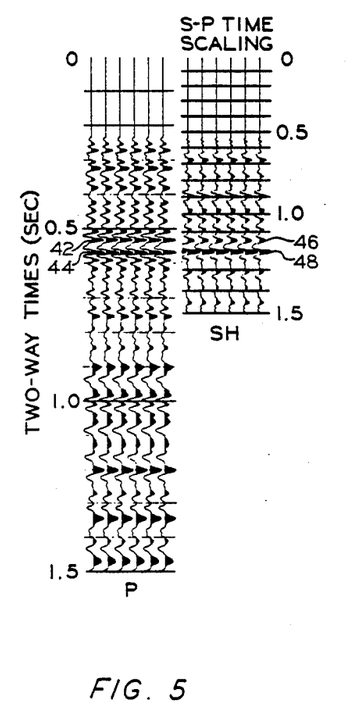
FIG. 5 shows summed P-traces and rescaled summed SH-traces obtained with the VSP embodiment of the present method.

After rescaling of the S-traces, the S and P-traces may be plotted in a conventional manner. P and SH-traces in FIG. 4 which have been rescaled and plotted according to the present method are shown in FIG. 5. The P and SH-traces in FIG. 4 have each been rescaled according to the present invention, and the upgoing events for all the traces summed to give a trace for the P and SH-modes shown in FIG. 5. Each trace is duplicated here six times for ease of viewing. As can be seen from the Figure, the time scale for the SH-traces are S-wave two-way times. The traces in each set are duplicated in this manner to more clearly show geologic intervals delineated by certain reflection events. The 0 sec to 1.5 sec time interval of the SH-traces have been rescaled in FIG. 4 and is shown in FIG. 5.

The accuracy of the correlation achieved can be seen by a visual examination of FIG. 5. For example, reflection event peaks 42 and 44 for the P-traces and peaks 46 and 48 for the SH-traces are very accurately aligned, and can be quickly and easily identified by a seismologist to represent the same geologic interval.

For the sake of illustration, the above-mentioned peaks may be employed to calculate the $V_p/V_s$ ratio for this particular interval. It should be understood that two-way times selected from the Figure are not necessarily accurate, but are given solely for the sake of illustration. The two way times for the S-trace peaks 48 and 46 are about 1.2 seconds and 1.15 seconds respectively. The two-way times for the P-trace peaks 44 and 42 are 0.57 and 0.53 seconds respectively. Thus, the $V_p/V_s$ ratio can be calculated from the formula $\Delta T_s/\Delta T_p$ as follows:

$$\frac{\Delta T_s}{\Delta T_p} = \frac{1.2 - 1.15}{.57 - .53}$$

$$= \frac{.05}{.04}$$

$$= 1.25$$

As explained above, this ratio can provide the seismologist critical information in determining characteristics of the geologic interval delineated by the selected reflection events.

In actual practice, the $V_p/V_s$ ratio would most probably be calculated by utilizing the unrescaled summed S-traces. Here, reflection events selected from the summed rescaled traces would be identified on the unrescaled traces. Two-way times for each reflection event would then be taken from the unrescaled time scale to give a more accurate velocity ratio calculation.

As previously discussed, the extremely accurate correlation of P and S-traces achieved with the present method enables the seismic interpreter to select reflection events on each trace for corresponding subsurface points. Without such an accurate correlation, reflection events selected from one trace may not delineate the same interval as that delineated by events selected from the other trace. This leads to an inaccurate calculation of $V_p/V_s$.

Figure 6:
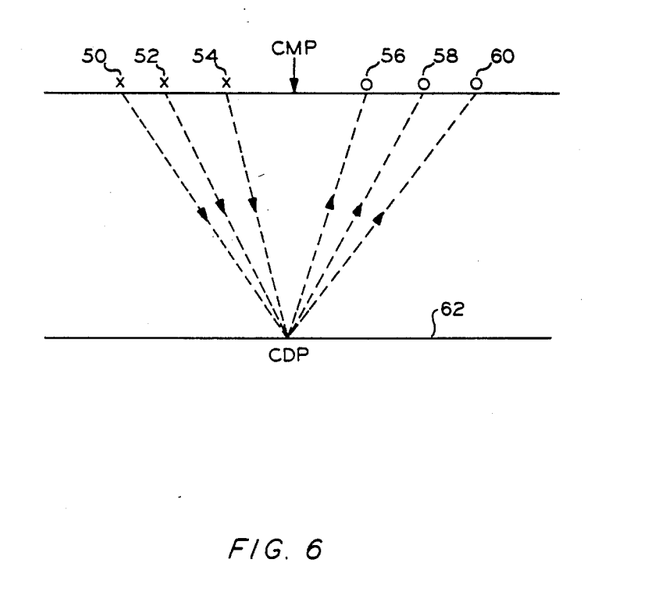
FIG. 6 is a schematic illustration of a surface seismic profile (SSP) apparatus to be employed in a SSP embodiment of the present method.

Referring now to FIG. 6, there is shown a schematic representation of an apparatus for obtaining a surface seismic profile (SSP). As shown, sources 50, 52, and 54 and geophone tools 56, 58 and 60 are arranged around a common midpoint (CMP). Typically, horizontal geophones are used to detect SH-waves, and vertical geophones to detect P-waves. For the sake of illustration, the sources are equidistantly spaced and the geophone tools are equidistantly spaced. A reflection plane 62 reflects waves from the seismic sources. Obviously, many reflection planes exist in actual practice.

The apparatus in FIG. 6 is used in an SSP embodiment of the present method as follows. It should be understood that in actual practice perhaps as many as 400 source or shot points might be used. The apparatus shown, therefore, has been simplified to facilitate a clear understanding of the invention.

P and S-waves are generated by each source sequentially, with the seismic signal being received and detected at a geophone which receives reflections from CDP and other common depth points in other reflecting planes which are aligned with CDP along a vertical line. For example, a P-wave and an S-wave might first be generated by source 54 and the resulting traces received by geophone 56. Source-geophone pair 52, 58 would be operated similarly, and so on. Thus, S and P-traces are received for each source geophone pair as described above. From these traces, actual two-way times, hereinafter denoted as $T_a$, can be obtained. In addition, other known data includes the horizontal distance, x, between a geophone or source and CMP. From the known data, x and $T_a$, two-way vertical travel times and depth are computed as follows.

From normal moveout (NMO) analysis, $$T_a^2 = T_v^2 + (x/V_{rms})^2, \qquad (7)$$

where $T_v$ is two-way vertical travel time and $V_{rms}$ is RMS velocity. Equation (7) may be linearized to be rewritten as $$T_a = \sqrt{T_v^2 + (X/V_{rms})^2} . \qquad (8)$$

For a particular reflecting plane and common depth point, then, $T_a$ may be obtained from each trace as detected by each geophone. In addition, x for each source-geophone pair is known as discussed above. Therefore, a linear equation of the form $y = mx + b$ may be fitted by least squares, for example, to the x and $T_a$ data. Slope m, or $(1/V_{rms})^2$, and y intercept b, or $T^2_v$, may be solved accordingly. Thus, for a particular type wave, $V_{rms}$ and $T_v$ may be solved for each reflection plane or event.

$V_{rms}$ may be changed to an average velocity $V_{ave}$ using standard equations. Depth for each common depth point in each reflecting plane can be calculated from $$\frac{V_{ave} \cdot T_v}{2} = \text{depth}(z) \qquad (9)$$

According to this embodiment, depth and $T_v$ are calculated for each reflecting plane for each type of wave mode to derive a set of time-depth pairs. Assume, for the sake of illustration, that a set of S-wave time-depth pairs are first derived. To derive this data, three S-traces are obtained with the illustrated apparatus. For a particular common depth point in a certain reflection plane, $T_a$ values are retrieved from each S-trace. These $T_a$ values and known x values are used to solve for a two-way vertical time, in this case $T_s$, and depth z in a manner as discussed above. This process is continued for each reflection plane. Thus, a set of S-wave time-depth pairs have been derived.

A set of P-wave time depth pairs are derived similarly.

Figure 7:
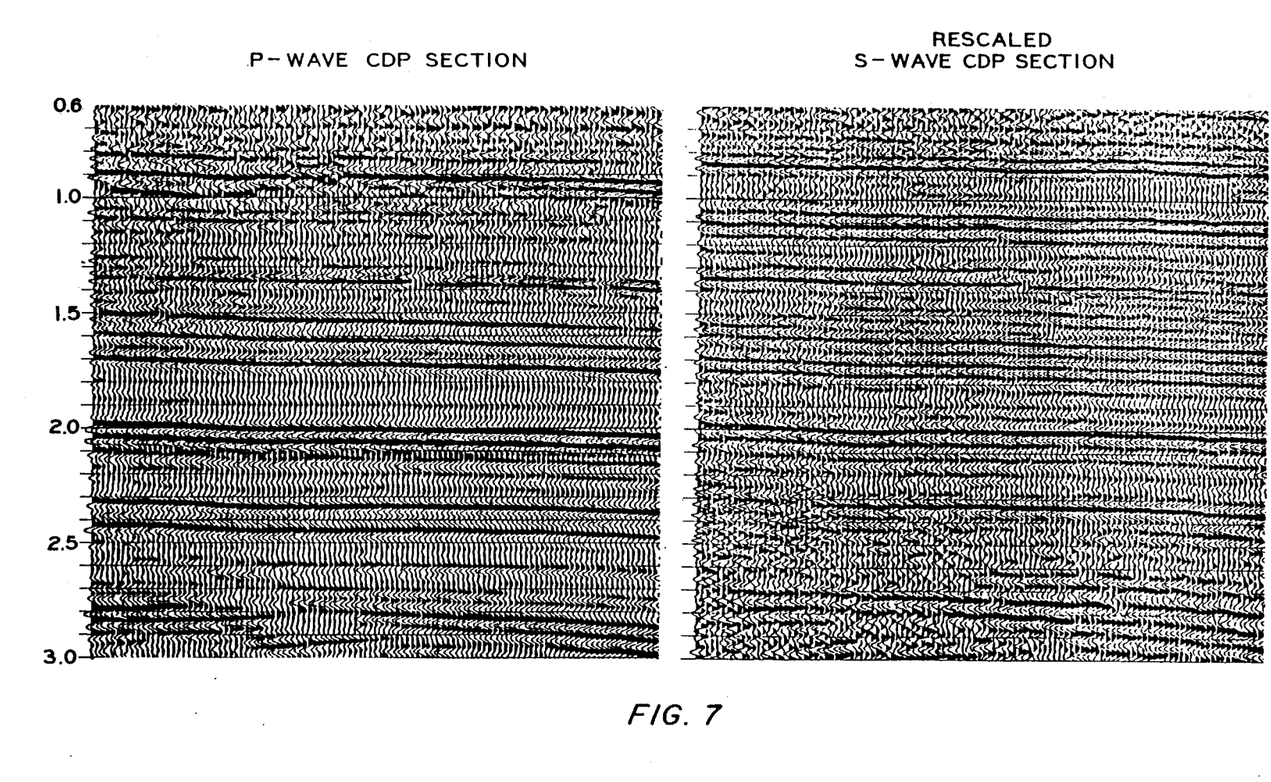
FIG. 7 shows correlated P and S wave surface seismic traces obtained with the SSP embodiment of the present method..

These time-depth pairs are utilized as described in the VSP embodiment to correlate P and S-wave traces. FIG. 7 shows an example of a rescaled S-wave stacked section and a P-wave section, which is described in more detail below.

In the SSP correlation described above, static time error can be introduced into the rescaled traces by the lack of near surface velocity information. This lack of near surface velocity information is due primarily to the fact that there are few resolvable reflections in the seismic data in the near surface. The above error can be corrected to a large extent by conventional cross correlation of the traces correlated as previously described. The cross correlation plot may then be examined to pick a window around the peak of best correlation. The traces are then cross correlated again with the window as a range to remove cycle skips. Accordingly, shift values are obtained to replot the rescaled trace.

One distinct advantage of the SSP embodiment is that the correlation of P and S-wave traces is performed without the use of well control data and is obtained from surface seismic data derived velocities.

Figure 8:
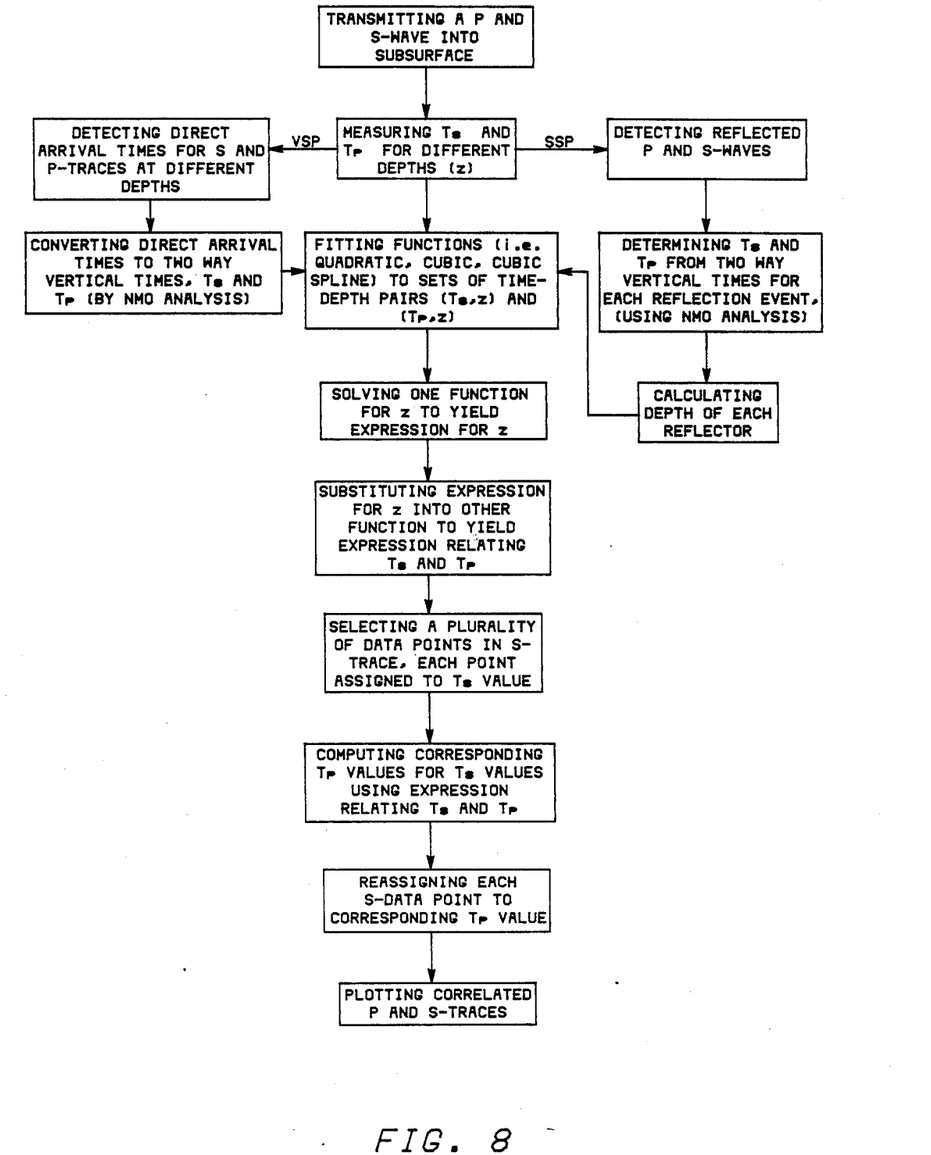
FIG. 8 is a flow chart showing the various steps in the two embodiments of the present invention described herein.

Referring now to FIG. 8, a flow chart is shown which outlines the various steps in the preferred VSP and SSP embodiments of the present method. For the sake of illustration, the steps shown involve the rescaling of the S-trace. The chart emphasizes that certain steps are common to each embodiment. In addition, it should be understood that steps in the method involving data processing are carried out in a computer according to a suitable program.

A particular example will now be presented which utilized the VSP embodiment of the present method. Data was gathered at the Foraker test site near Bartlesville, Okla. The source used was an impulsive weight dropping hammer inclined 45° from the vertical to produce P and S-waves. Other features of the set-up were substantially similar to those shown in FIG. 2. The VSP survey acquired with the symmetrical geophones was recorded at a 2 msec sample rate at 50 ft intervals between 1000 ft and 2600 ft. Three to five shots were recorded at each depth level.

FIG. 3 shows the quadratic fits obtained for the time-depth pairs.

FIG. 4 shows the aligned upgoing energy events obtained for the P, SV and SH wave modes that would allow time-depth correlations of P and S wave reflection events to be made from this type of VSP data acquisition. These reflection events were obtained from the full VSP response of each of these modes using a F-K filter which suppressed the downgoing energy events by 40 db. The velocity windows used to separate the upgoing events were −1 ft/sec to −17000 ft/sec for the P mode and −1 ft/sec to −7000 ft/sec for the S modes. This frequency window has a 10-60 Hz bandwidth.

FIG. 5 shows summed SH traces rescaled according to the above example alongside the summed P-traces.

As an additional example, FIG. 7 shows correlated P and S-wave seismic sections correlated according to the SSP embodiment of the present invention. Each trace in FIG. 7 for either the P or S-wave section is an NMO and stacked version of FIG. 6 with the S-wave data rescaled to the P time scale.

Generally, then, the method of the present invention involves the measurement of two-way vertical travel times to different depths in the subsurface so as to yield two sets of time-depth pairs. Each of the above described embodiments, VSP and SSP, provide convenient techniques for making these measurements. As noted above, the sets of time-depth pairs are fitted to functions which are combined to give an expression relating $T_s$ and $T_p$, thereby enabling correlation of P and S-wave traces.

Obviously many modifications and variations of the present invention are possible in light of the above teachings. It is therefore to be understood that within the scope of the appended claims the invention may be practiced otherwise than as specifically described.

That which is claimed is:

1. A method of processing seismic data enabling the correlation of P and S-wave wiggle traces comprising the steps of:
   (a) transmitting a P-wave and an S-wave into the subsurface of the earth;
   (b) measuring the two-way vertical travel times of the S-wave to different depths in the subsurface, thereby yielding a set of S-wave time-depth pairs wherein each time-depth pair includes a depth value z and a corresponding S-wave two-way vertical travel time value $T_s$;
   (c) measuring the two-way vertical travel times of the P-wave to different depths in the subsurface, thereby yielding a set of P-wave time-depth pairs, wherein each time-depth pair includes a depth value z and a corresponding P-wave two way vertical travel time value Tp;
   (d) fitting a first mathematical function relating $T_s$ and depth z to the set of S-wave time depth pairs;
   (e) fitting a second mathematical function relating $T_p$ and depth z to the set of P-wave time depth pairs;
   (f) combining the first and second functions so as to yield an expression relating respective S and P-wave two-way vertical travel time values $T_s$ and $T_p$.

2. A method of correlating S and P-wave type seismic wiggle traces comprising the steps of:
   (a) transmitting a P-wave and an S-wave into the subsurface of the earth;
   (b) measuring the two-way vertical travel times of the S-wave to different depths in the subsurface, thereby yielding a set of S-wave time-depth pairs wherein each time-depth pair includes a depth value z and a corresponding S-wave two-way vertical travel time value $T_s$;
   (c) measuring the two-way vertical travel times of the P-waves to different depths in the subsurface, thereby yielding a set of P-wave time-depth pairs, wherein each time-depth pair includes a depth value z and a corresponding P-wave two-way vertical travel time value $T_p$;
   (d) fitting a first mathematical function relating $T_s$ and depth z to the set of S-wave time depth pairs;
   (e) fitting a second mathematical function relating $T_p$ and depth z to the set of P-wave time depth pairs;
   (f) combining the first and second mathematical functions so as to yield an expression relating respective S and P-wave two-way vertical travel time values $T_s$ and $T_p$;
   (g) selecting a plurality of data points in one type wave trace which is to be correlated with the other type wave trace, each type of wave trace being selected from the P and S-wave types, each data point being assigned to a one-type wave two-way vertical travel time value;
   (h) computing for each one type wave vertical travel time value a corresponding other type wave vertical travel time value from the expression relating $T_s$ and $T_p$;
   (i) reassigning each data point on the one type wave trace to a corresponding other type wave two-way vertical travel time value, thereby producing a rescaled one-type wave trace correlated with the other type wave trace.

3. A method as recited in claim 2, further comprising the step of plotting the rescaled one-type wave trace and the other type wave trace.

4. A method as recited in claims 1 or 2 wherein, in step (a), the P and S-waves are transmitted from a source on the earth's surface offset in horizontal distance from a set of depth points, each depth point being at a different depth.

5. A method as recited in claim 4, wherein each of said measuring steps (b) and (c) includes the steps of: measuring the direct travel time of the wave along a direct travel path from the source to each depth point; converting each direct travel time to one-way vertical travel time; and converting each one-way vertical travel time to two-way vertical travel time by multiplying each one-way vertical travel time by two.

6. A method as recited in claim 5, wherein the P and S-wave wiggle traces to be correlated result from the transmission of the P and S-waves into the subsurface as recited in step (a).

7. A method as recited in claim 6, wherein said direct travel time measuring step includes the step of: positioning a geophone at each depth point so as to detect the wave directly arriving from the source.

8. A method as recited in claim 7, wherein step (f) comprises the steps of: solving one function for z to yield an expression for z in terms of travel time; and substituting the expression for z into the other function to yield the expression relating $T_s$ and $T_p$.

9. A method as recited in claim 8, wherein the functions are cubic functions.

10. A method as recited in claim 8, wherein the functions are cubic spline functions.

11. A method as recited in claim 8, wherein the functions are quadratic functions.

12. A method as recited in claims 1 or 2 wherein, in step (a) the P and S-wave are transmitted by a surface source, the P and S-waves being reflected by subsurface reflectors, wherein a reflection event correspond to each type of wave for each reflector.

13. A method as recited in claim 12, wherein steps (b) and (c) comprise the steps of: surface detecting the reflected P and S-waves; determining two-way vertical travel times for each reflection event of the reflected P and S-waves wherein the two-way vertical travel times so determined for the P and S-waves are $T_s$ and $T_p$ values respectively; and calculating the depth z of each subsurface reflector.

14. A method as recited in claim 13, wherein step (f) comprises steps of: solving one function for z to yield an expression for z in terms of travel time; and substituting the expression for z into the other function to yield the expression relating $T_s$ and $T_p$.

15. A method as recited in claim 14 wherein the functions are cubic functions.

16. A method as recited in claim 14 wherein the functions are cubic spline functions.

17. A method as recited in claim 14 wherein the functions are quadratic functions.

* * * * *